United States Patent
Iwase et al.

(10) Patent No.: US 8,817,157 B2
(45) Date of Patent: Aug. 26, 2014

(54) IMAGING CONTROL DEVICE AND IMAGING CONTROL METHOD HAVING INTELLIGENT AUTO MODE FEATURES

(75) Inventors: Ayako Iwase, Kanagawa (JP); Ryo Takaoka, Tokyo (JP); Fumikazu Hatanaka, Nara (JP); Chiho Tsuchiya, Tokyo (JP); Nobuki Furue, Tokyo (JP)

(73) Assignee: Sony Corporation (JP)

( * ) Notice: Subject to any disclaimer, the term of this patent is extended or adjusted under 35 U.S.C. 154(b) by 288 days.

(21) Appl. No.: 13/065,800

(22) Filed: Mar. 30, 2011

(65) Prior Publication Data

US 2011/0249139 A1    Oct. 13, 2011

(30) Foreign Application Priority Data

Apr. 9, 2010 (JP) ................ P2010-090273

(51) Int. Cl.
*H04N 5/222* (2006.01)
(52) U.S. Cl.
USPC ................ 348/333.01; 348/333.02
(58) Field of Classification Search
CPC ................................. H04N 5/23293
USPC ..................................... 348/333.01
See application file for complete search history.

(56) References Cited

U.S. PATENT DOCUMENTS

| | | | |
|---|---|---|---|
| 2004/0189856 A1* | 9/2004 | Tanaka | 348/345 |
| 2005/0057677 A1* | 3/2005 | Hagiwara et al. | 348/333.01 |
| 2005/0094015 A1* | 5/2005 | Kuruma | 348/333.01 |
| 2006/0029381 A1* | 2/2006 | Onozawa | 396/147 |
| 2009/0059054 A1 | 3/2009 | Oishi et al. | |
| 2009/0237548 A1* | 9/2009 | Watanabe et al. | 348/333.02 |
| 2010/0296806 A1* | 11/2010 | Seo et al. | 396/236 |
| 2011/0064399 A1* | 3/2011 | Tohyama | 396/242 |

FOREIGN PATENT DOCUMENTS

JP    2009-060195 A    3/2009

* cited by examiner

*Primary Examiner* — Roberto Velez
*Assistant Examiner* — Cynthia Segura
(74) *Attorney, Agent, or Firm* — Lerner, David, Littenberg, Krumholz & Mentlik, LLP

(57) ABSTRACT

A imaging control device includes a scene recognition section which recognizes scenes showing a subject by analyzing obtained image data, a display section which displays the obtained image data, an imaging mode selection section which prepares a plurality of imaging modes where a parameter which adjusts image characteristics according to each scene is set in advance and which automatically selects an imaging mode corresponding to the recognized scene from a plurality of imaging modes, a first operation section which generates a first operation signal which locks the imaging mode at a current imaging mode during the operation of automatically selecting the imaging mode, and a second operation section which generates a second operation signal which adjusts a portion of the parameter in a state where the imaging mode is locked, where an adjustment range using the second operation section is within a range limited by the locked imaging mode.

11 Claims, 9 Drawing Sheets

18 mm 70 mm 18 mm

IMAGING CONTROL DEVICE AND IMAGING CONTROL METHOD HAVING INTELLIGENT AUTO MODE FEATURES

CROSS-REFERENCE TO RELATED APPLICATION

The present application claims priority from Japanese Patent Application No. JP 2010-090273 filed in the Japanese Patent Office on Apr. 9, 2010, the entire content of which is incorporated herein by reference.

BACKGROUND OF THE INVENTION

1. Field of the Invention

The present invention relates to an imaging control device and an imaging control method which is able to obtain an imaging image with simple operations which reflects preferences of a user.

2. Description of the Related Art

As a factor in deciding exposure in photograph imaging, there is an ISO (International Organization for Standardization) value (which means sensitivity), shutter speed, and a lens aperture value (referred to as F-number). When considering the ISO value as fixed, shutter speed and the F-number are adjusted and the amount of exposure is controlled. An EV (exposure value) number (appropriately referred to as EV value) is allocated to a combination of shutter speed and F-number where the amount of exposure is the same.

Automatic exposure (AE) is the automatic control of shutter speed and the F-number according to the brightness of a subject. As methods of automatic exposure, there are three types of methods. That is, there are shutter priority AE, aperture priority AE, and program AE. The shutter priority AE (referred to as S mode) is a method where, when the photographer sets a desired shutter speed, the F-number is automatically controlled in a camera so that there is an appropriate EV value. The aperture priority AE (referred to as A mode) is a method where, when the photographer sets a preferred F-number, the shutter speed is automatically controlled in a camera so that there is an appropriate EV value. The program AE (auto mode) is a method of setting in advance a recommended combination of the F-number and the shutter speed with regard to an EV value.

In an actual camera, for example, a digital single-lens imaging device, furthermore, it is possible to set a photographing mode corresponding to the subject (scene selection mode) or a mode where exposure is manually decided (referred to as M mode). The scene selection mode selects a scene by, for example, a user rotating a mode selection dial. Here, scene is a term expressing types of subjects. "People", "landscape", "direct light", "backlighting" and the like are examples of scenes.

Furthermore, a mode is proposed where scene selection is performed automatically by the imaging device (for example, Japanese Unexamined Patent Application Publication No. 2009-60195). The mode is called intelligent auto. In intelligent auto mode, the imaging device analyses an image during imaging, detects characteristics of the image, recognizes a scene from the characteristics, and an imaging mode is automatically selected corresponding to the recognized scene. That is, in the intelligent auto mode, the camera automatically recognizes the scene and sets optimal parameters without any particular setting by a user.

The intelligent auto mode is where the camera sets a combination of an F-number, shutter speed, an ISO value, a white balance value, and a creative style value appropriate for the scene (type of subject). An image style corresponding to imaging intention and characteristics of a photographer is the creative style value. The F-number, shutter speed, and the ISO value are imaging conditions, and the white balance value and the creative style value are conditions of image processing.

There are cases when a user does not want to rely on the camera and wants to take a photograph where the parameter values are changed and setting is performed by the user. For example, in a case of wanting to take a photograph where the background is out of focus, an operation is performed where the mode is set to A mode and an aperture is opened (the F-number is reduced). It is necessary for a photographer to have knowledge relating to the depth of field in out-of-focus adjusting. By increasing the F-number, it is possible to increase the depth of field, and by decreasing the F-number, it is possible to reduce the depth of field.

SUMMARY OF THE INVENTION

To a user who is not accustomed to cameras, it is not simple that an operation for performing desired out-of-focus adjusting in A mode. Additionally, a method is proposed for adding out-of-focus using image processing, but there are problems in that this method does not enable the generation of out-of-focus which matches the intention of a photographer and the burden on software for image processing increases.

Accordingly, it is desirable to provide an imaging control device and an imaging control method where image characteristics of an imaging image are able to be adjusted by a user performing simple operations.

An imaging control device according to an embodiment of the invention is provided with a scene recognition section which recognizes scenes showing a subject by analyzing obtained image data, a display section which displays the obtained image data, an imaging mode selection section which prepares a plurality of imaging modes where a parameter which adjusts image characteristics according to each scene is set in advance and which automatically selects an imaging mode corresponding to the recognized scene from a plurality of imaging modes, a first operation section which generates a first operation signal which locks the imaging mode at the current imaging mode during the operation of automatically selecting the imaging mode, and a second operation section which generates a second operation signal which adjusts a portion of the parameter in a state where the imaging mode is locked, and an adjustment range using the second operation section is within a range limited by the locked imaging mode.

An imaging control method according to another embodiment of the invention includes the steps of recognizing scenes showing a subject using a scene recognition section by analyzing obtained image data, displaying the obtained image data using a display section, preparing a plurality of imaging modes where a parameter which adjusts image characteristics according to each scene is set in advance and automatically selecting an imaging mode corresponding to the recognized scene from a plurality of imaging modes using an imaging mode selection section, generating a first operation signal which locks the imaging mode at the current imaging mode using a first operation section during the operation of automatically selecting the imaging mode, and generating a second operation signal which adjusts a portion of the parameter using a second operation section in a state where the imaging mode is locked, where the adjustment scope using the second operation section is within a scope limited by the locked imaging mode.

It is desirable to, in a case where the scene recognition section has not completed recognition of a scene, lock the imaging mode in an imaging mode, which is universally used in an imaging state where scene recognition is not determined, during an operation of the first operation section.

It is desirable to, in a case where the scene recognition section has not completed recognition of a scene, lock the imaging mode in an imaging mode, which is selected in the nearest operation of the first operation section, during an operation of the first operation section.

It is desirable to reset the parameter after adjustment from a parameter adjustment state and provide a third operation section which generates a third operation signal for returning to a state where the imaging mode is automatically selected.

It is desirable to also use a shutter button as the third operation section.

It is desirable that the parameter is at least one of imaging conditions and image data processing conditions.

It is desirable that the parameter is an F-number, shutter speed, sensitivity, a white balance value, an image style corresponding to an imaging intention and characteristics or a combination of two or more of these.

It is desirable to, in a case where the F-number is a parameter, match a range of the F-number able to be obtained by the imaging device and a range of both ends of an indicator, and display the indicator on the display section.

It is desirable to receive focal point distance information from a zoom lens, and change and display a movable range of the indicator according to the received focal point distance information.

It is desirable to, in a case where the F-number is a parameter, match a range of the F-number obtainable in a current state and a range of both ends of an indicator, and display the indicator on the display section.

According to the embodiments of the invention, in a case of automatically selecting an imaging mode corresponding to a scene recognized by an analysis of an imaging image, it is possible for the imaging mode to be locked at an imaging mode being selected by an operation of a user and for a parameter to be adjusted within a range limited by the imaging mode. Accordingly, even in a case where the user does not have knowledge relating to the parameter, it is possible to obtain an imaging image with simple operations which reflects the preferences of the user.

DESCRIPTION OF THE PREFERRED EMBODIMENTS

Below, an embodiment of the invention will be described. In addition, the description will be performed in the order below.

1. Embodiment according to the Invention
2. Modified Examples

In addition, the embodiment described below is a preferable specific example of the invention, and there are various limitations which are technically preferable. However, in the description below, the scope of the invention is not limited by the embodiment unless there is a description which in particular limits the invention.

1. Embodiment According to the Invention

Imaging Device

Figure 1:
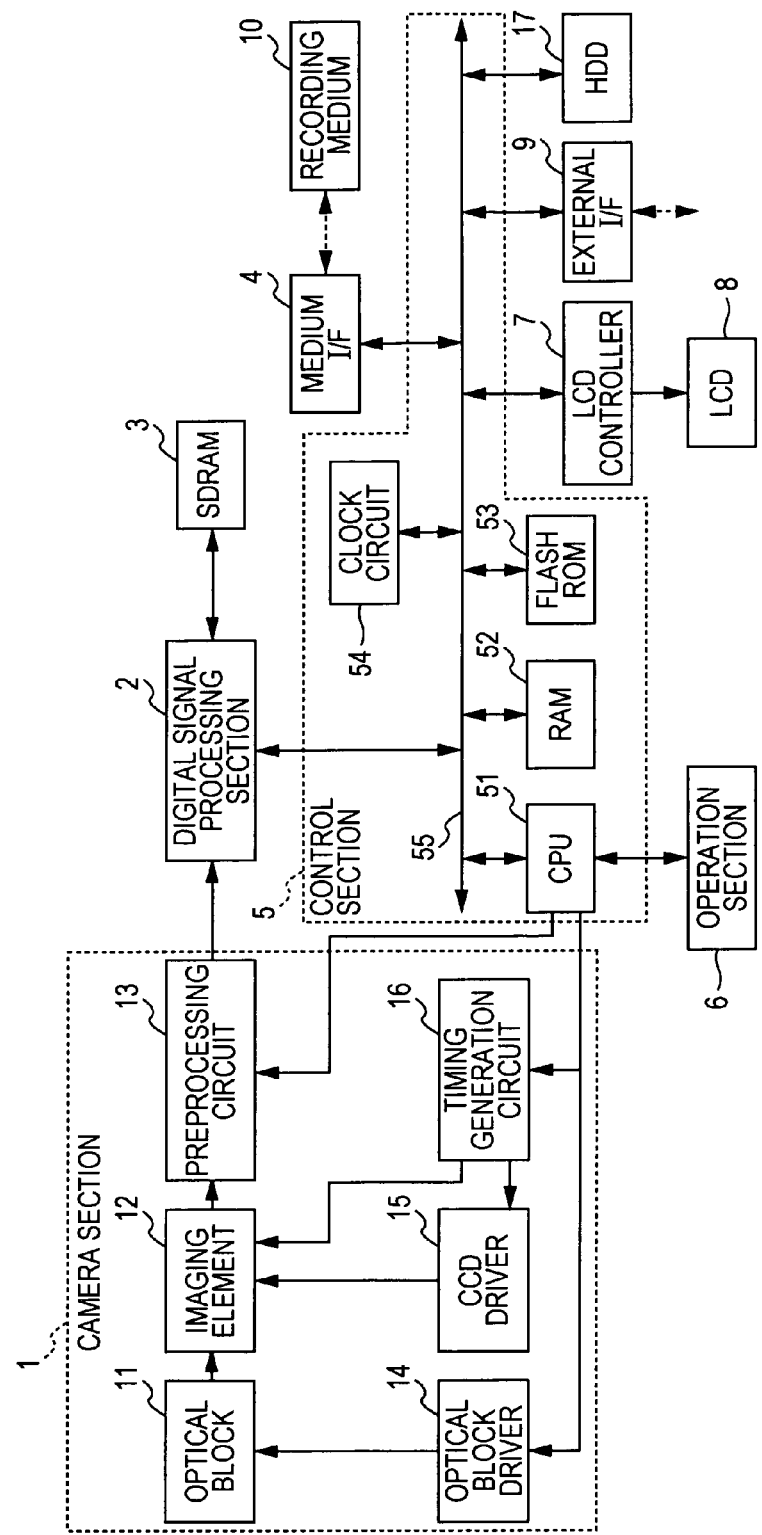
FIG. 1 is a block diagram of an imaging device to which an imaging control device according to an embodiment of the present invention is applied.

The embodiment of the invention will be described. An example of an imaging device which is able to apply the invention will be described with reference to FIG. 1. The imaging device is formed from a camera section 1, a digital signal processing section 2, an SDRAM (Synchronous Dynamic Random Access Memory) 3, a medium interface (referred to below as medium I/F) 4, a control section 5, an operation section 6, an LCD (Liquid Crystal Display) controller 7, an LCD 8, and an external interface (referred to below as external I/F) 9, and a recording medium 10 is removable with regard to the medium I/F 4. Furthermore, a hard disk drive 17 is provided which is a large-capacity recording medium for accumulating image files.

The recording medium 10 is, for example, a so-called memory card which uses a semiconductor memory. Other than the memory card, it is possible to use a hard disk device, an optical recording medium such as a recordable DVD (Digital Versatile Disc) or a recordable CD (Compact Disc), a magnetic disc, or the like.

The camera section 1 is provided with an optical block 11, an imaging element 12 such as a CCD (Charge Coupled Device) or a CMOS (Complementary Metal Oxide Semiconductor), a preprocessing circuit 13, an optical block driver 14, a CCD driver 15, and a timing generation circuit 16. Here, the optical block 11 is provided with a lens, a focus mechanism, a shutter mechanism, an aperture (iris) mechanism, and the like.

The control section 5 is a micro computer configured by connecting a CPU (Central Processing Unit) 51, a RAM (Random Access Memory) 52, a flash ROM (Read Only Memory) 53, and a clock circuit 54 via a system bus 55, and controls each section of the imaging device of the embodiment. The RAM 52 is used mainly as a work area for temporarily storing results during processing. The flash ROM 53 stores various programs executed by the CPU 51, data necessary for processing, and the like. The clock circuit 54 provides a current date, current day of the week, current time, time and data at the time of imaging, and the like, and has a function of allocating time and data information such as the time and data of imaging to an imaging image file.

When imaging, the optical block driver 14 forms driving signals for operating the optical block 11 according to controls from the control section 5 and supplies the driving signals to the optical block 11, and the optical block 11 is operated. In the optical block 11, the focus mechanism, the shutter mechanism, and the aperture mechanism are controlled according to the driving signal from the driver 14, a subject image is taken, and the subject image is provided to the imaging element 12. Furthermore, a lens device of the optical block 11 is able to be exchanged. For example, in an inner portion of the lens device, a micro computer is configured and information such as the type of lens device and current focal point distance are transmitted to the CPU 51.

The imaging element 12 performs photoelectric conversion of, and then outputs, the subject image from the optical block 11. The imaging element 12 is operated according to a driving signal from the imaging element driver 15, the subject image is taken, and based on a timing signal from the timing generation circuit 16 controlled by the control section 5, an image of the taken subject is supplied to the preprocessing circuit 13 as an electrical signal.

In addition, the timing generation circuit 16 forms timing signals provided at a predetermined timing according to controls from the control section 5. Additionally, the imaging element driver 15 forms a driving signal supplied to the imaging element 12 based on the timing signal from the timing generation circuit 16.

With regard to the supplied imaging signal, the preprocessing circuit 13 performs CDS (Correlated Double Sampling) processing and improves an S/N ratio, performs AGC (Automatic Gain Control) processing and controls a gain, and then forms image data which is set as a digital signal by A/D (Analog/Digital) conversion.

The digital image data from the preprocessing circuit 13 is supplied to the digital signal processing section 2. The digital signal processing section 2 performs camera signal processing of AF (Auto Focus), AE (Auto Exposure), AWB (Auto White Balance), and the like with regard to the image data. The image data where camera signal processing has been performed is compressed by a predetermined compression method, is supplied to the loaded recording medium 10 and/or the hard disk drive 17 via the system bus 55 and the medium I/F 4, and is recorded as an image file based on, for example, a DCF (Design rule for Camera File system) standard in the recording medium 10 and/or the hard disk drive 17.

Additionally, the image data recorded in the recording medium 10 is supplied to the digital signal processing section 2 by reading out the target image data from the recording medium 10 via the medium I/F 4 according to the received operation input from the user via the operation section 6. In the operation section 6, various buttons, levers, dials, and the like such as a shutter release button are included. The LCD 8 is configured as a touch panel and it is possible to perform an input operation by the user pressing on a screen with a finger or a pointing device.

With regard to the compressed image data which is read out from the recording medium 10 and supplied via the medium I/F 4, the digital signal processing section 2 performs decompression processing of the compression, and the image data after decompressing is supplied to the LCD controller 7 via the system bus 55. The LCD controller 7 forms display image signals supplied to the LCD 8 from the image data and supplies the display image signals to the LCD 8. According to this, the image corresponding to the image data recorded in the recording medium 10 is displayed on the screen of the LCD 8. Furthermore, due to the controlling of the LCD controller 7 and the control section 5, it is possible to perform a display of text and graphics such as a menu on the screen of the LCD 8. In addition, the form of the display of the image follows a display processing program recorded in a ROM.

Additionally, the imaging device is provided with the external I/F 9. Via the external I/F 9, for example, an external personal computer is connected, and it is possible to receive a supply of image data from the personal computer and record the image data on a recording medium loaded therein or to supply image data recorded on a recording medium loaded therein to the external personal computer.

Additionally, by connecting the external I/F 9 to a communication module, for example, a network such as the internet is connected, and it is possible for various image data or other information to be acquired via the network and be recorded on a recording medium loaded therein or for data recorded on a recording medium loaded therein to be transmitted to a target destination via the network.

Additionally, even with regard to information such as image data obtained via an external computer or a network and recorded on a recording medium, it is possible to be read out, reproduced and displayed on the LCD 8.

In addition, it is possible for the external I/F 9 to be provided as a wired interface such as an IEEE (Institute of Electrical and Electronics Engineers) 1394 or a USB (Universal Serial Bus), and it is possible for the external I/F 9 to be provided as a wireless interface using light or radio waves. That is, the external I/F 9 may be a wired or a wireless interface. Via the external I/F 9, it is possible to connect to, for example, an external computer device (not shown), receive a supply of image data from the computer device and record the image data on the recording medium 10 and/or the hard disk drive 17. It is also possible to supply image data recorded on the recording medium 10 and/or the hard disk drive 17 to an external computer device or the like.

Using the imaging device described above, it is possible for an image of a subject (a still image or moving images) to be imaged and recorded on the loaded recording medium 10 and/or the hard disk drive 17. Furthermore, it is possible for the image data recorded on the recording medium 10 and/or the hard disk drive 17 to be read out and the image to be displayed, arbitrarily browsed and edited. An index file for managing the image data is recorded in a predetermined region on the recording medium 10 and/or the hard disk drive 17.

Here, operations of the imaging device described above will be schematically described. Signals which are received and photoelectrically converted using the imaging element 12 are supplied to the preprocessing circuit 13, CDS processing and AGC processing are performed, digital conversion is performed, and the signals are supplied to the digital signal processing section 2. In the digital signal processing section 2, image characteristics correction processing is carried out on the image data and the image data is supplied to the control section 5 as image data of a camera-through image. The image data input from the control section 5 is supplied to the LCD controller 7 and the camera-through image is displayed on the LCD 8. It is possible to perform matching of the angle of view while viewing the camera-through image displayed on the LCD 8.

Then, when a shutter button in the operation portion 6 is pressed, the CPU 51 outputs a control signal to the camera section 1 and the shutter of the optical block 11 is operated. Along with this, after processing of one frame of image data (recorded image data) supplied from the preprocessing circuit 13 by the digital signal processing section 2, the image data is recorded in the SDRAM 3. Next, the recorded image data is compressed and coded by the digital signal processing section 2, and the coded data is recorded on the hard disk drive 17 and recorded on the recording medium 10 via the system bus 55 and the medium I/F 4.

In addition, in regard to still image data, time and data or timing of the imaging is obtained by the CPU 51 from the clock circuit 54, attached to the data and recorded on the hard disk drive 17 and the recording medium 10. Furthermore, in regard to still image data, next, compressed image data of the still image is generated and the compressed image data is recorded on the hard disk drive 17 and the recording medium 10 to correspond to the original still image.

On the other hand, in a case where the recorded image data recorded on the hard disk drive 17 and the recording medium 10 is reproduced, the recorded image data selected by the CPU 51 is read into the SDRAM 3 according to the operation input from the operation section 6. Then, the image data is decoded by the digital signal processing section 2. The decoded image data is supplied to the LCD 8 via the LCD controller 7 and the reproduced image is displayed on the LCD 8.

In the embodiment of the invention described above, there is a configuration of the scene recognition section, which recognizes scenes showing a subject by analyzing image data which the control section 5 including the CPU 51 obtains from the imaging element 12, and the imaging mode selection section. The imaging mode selection section prepares a plurality of imaging modes where a parameter which adjusts image characteristics according to each recognized scene is set in advance and automatically selects an imaging mode corresponding to the recognized scene from a plurality of imaging modes. The intelligent auto mode is performed by using such a scene recognition section and imaging mode selection section.

Program Diagram

Describing the intelligent auto imaging mode, the control section 5 controls the camera section 1 and the digital signal processing section 2 in accordance with a program diagram corresponding to the recognized scene. For simplicity, if only the imaging conditions are controlled and the ISO value is fixed, the F-number and shutter speed are controlled as shown in FIG. 2.

Figure 2:
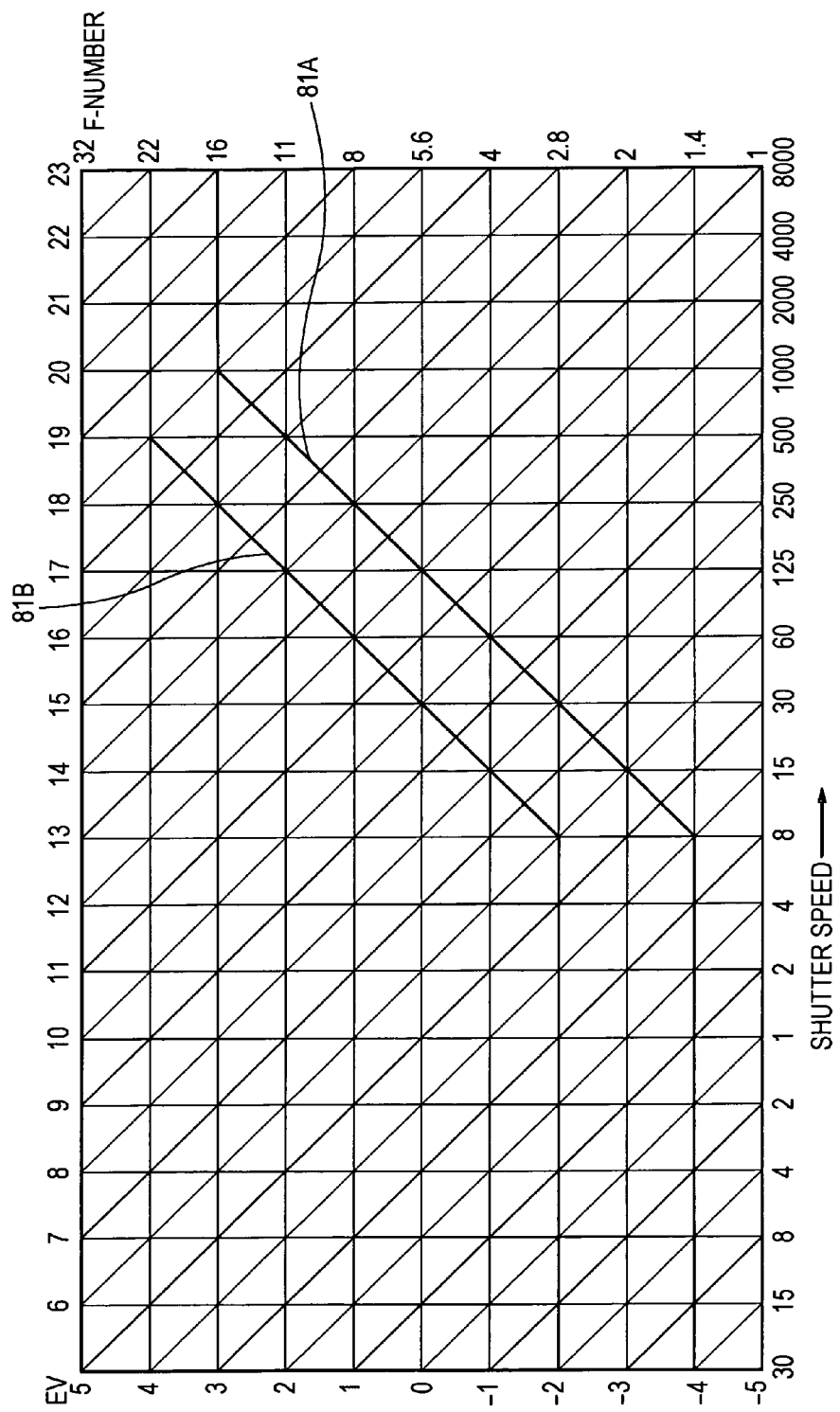
FIG. 2 is an approximate diagram illustrating an example of a program diagram of the imaging device.

In FIG. 2, the vertical axis represents the F-number, the horizontal axis represents shutter speed, and the diagonal line represents the EV value. With regard to shutter speed, in order for the diagram to be simple, only the value of the denominator is shown with regard to shutter speeds faster than one second. For example, the notation "250" has a meaning of a shutter speed of "1/250". For example, EV value=0 has a meaning of brightness of a subject with an appropriate exposure at (F1, shutter speed=1 second). When the F-number or shutter speed increases or decreases by one level, the EV value increases or decreases by one.

In the program diagram 81A of FIG. 2, a program diagram of a standard mode (for example, in a case where the subject is a person) is shown. In the case of the program diagram 81A, when the subject is very dark, shutter speed is set to a value of ⅛ seconds or less with F1.4 (open). The subject becomes brighter to correspond with shutter speed becoming faster. When the shutter speed exceeds ⅛ seconds, to maintain the brightness, the shutter speed is made faster and the F-number is increased. According to the subject becoming brighter than (EV value=4), an appropriate exposure is set by adjusting both the F-number and shutter speed. When the brightness of the subject becomes extremely bright, this is dealt with only the shutter speed.

A program diagram 81B is a case where, for example, a landscape scene is taken and a range of changes of the F-number with regard to changes in the brightness of the subject is narrow compared to the standard mode. This is to control so that the depth of field does not become shallow. The example of the program diagram of FIG. 2 is very schematic, and in reality, very many program diagrams are prepared using ISO values, the type of lens used (for example, zoom lens), and the like.

The control section 5 recognizes a scene from the image characteristics by analyzing the camera-through image and grasping the characteristics of the image. The camera section 1 and the digital signal processing section 2 are controlled in accordance with the program diagram of the imaging mode according to the recognized scene. In the invention, in the program diagram of the selected imaging mode, a parameter of the imaging conditions or the image processing conditions are adjusted within the range of permissible changes of image characteristics. In the embodiment of the invention, the F-number is adjusted, adjustment of the depth of field is performed, and the extent to which the background is out of focus is adjusted. Such adjusting of the extent to which the background is out of focus is referred to as out-of-focus adjustment. In addition, the range of permissible changes of image characteristics is, for example, within the range of appropriate exposure.

Example of Operation Section

Figure 3:
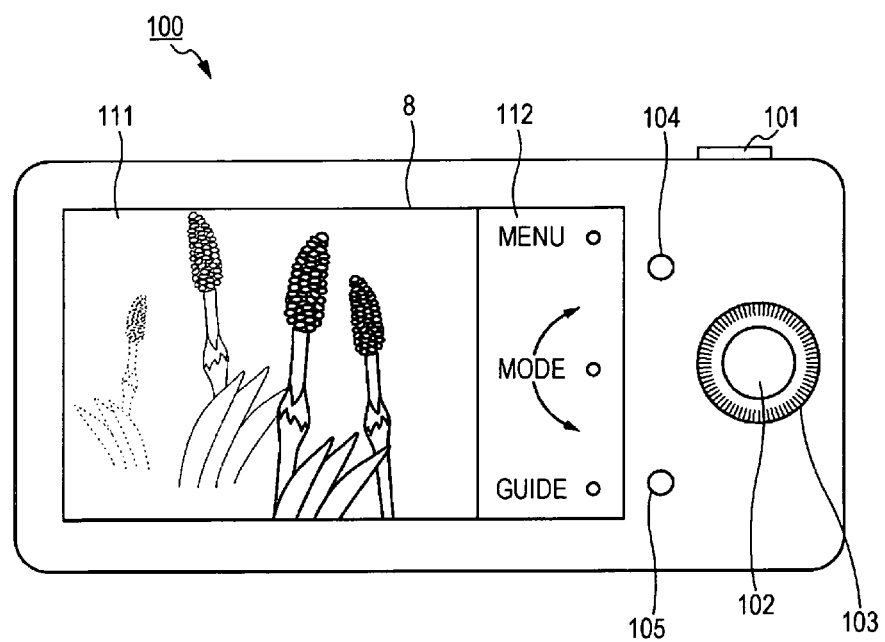
FIG. 3 is an approximate diagram illustrating an arrangement of a rear surface panel of the imaging device according to an embodiment of the invention.

As shown in FIG. 3, in a rear surface panel 100 of the imaging device, a center key 102 with a pressing button switch configuration, a shuttle key 103 disposed to be able to be rotated in a periphery thereof, and soft keys 104 and 105 which have a pressing button switch configuration are provided. In addition, a shutter button 101 is provided in an upper surface of a case. The keys configure the operation section 6.

When the center key 102 is pressed, in the intelligent auto mode where the imaging mode is automatically selected according to a scene, a first operation signal is generated which locks the imaging mode to the current imaging mode. In a state where the imaging mode is locked, when the shuttle key 103 is rotated, a second operation signal is generated which adjusts a parameter, for example, the F-number. The operation signals are supplied to the CPU 51 and the CPU 51 controls each section according to the operation signals.

The screen of the LCD 8 disposed on the rear surface panel 100 is divided into an image display area 111 and a user interface display area (appropriately referred to below as the UI display area) 112. During imaging, the camera-through image is displayed on the image display area 111. In the UI display area 112, a display with a user operation guide, a display of key functions, a display for adjusting during out-of-focus adjustment, and the like are displayed.

As shown in FIG. 3, on the UI display area 112, a soft keys 104 and 105 operation guide and a center key 102 operation guide are displayed. In addition, it is typical that various icons are displayed on the image display area 111, but the display of icons not particularly related to the invention is not included.

Processing Flow of Embodiment

The processing flow of the embodiment of the invention will be described with reference to a flow chart and a screen display of the LCD 8. Processing is performed which is shown in the flow chart of FIG. 4 by controlling using the control section 5. In step S1, an intelligent auto operation is performed and the imaging mode is automatically set according to the scene recognition result.

Figure 5A:
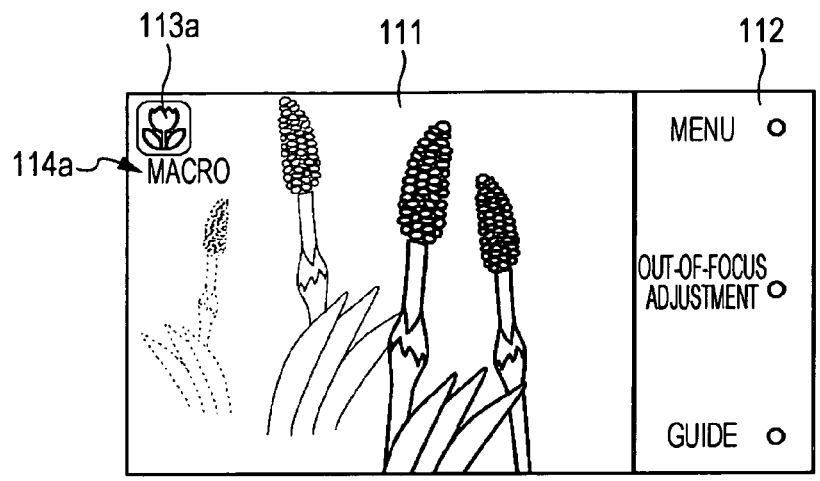
FIGS. 5A and 5B are approximate diagrams used to describe an LCD display screen according to an embodiment of the invention.

As shown in FIG. 5A, on the image display area 111, the camera-through image during imaging (also referred to as an EE image) is displayed, and an imaging mode icon 113a which shows the current imaging mode and an imaging mode text 114a which shows the current imaging mode are displayed. In the example shown in FIG. 5A, the scene recognition section recognizes a scene imaged by coming close to plants and the imaging mode is set as "macro" by the imaging mode setting section. As the plurality of imaging modes, there are "people", "landscape", "night scene", "night scene and people", "backlighting and people", "backlighting and landscape", and the like. The imaging conditions and the image processing conditions are set in accordance with the program diagram corresponding to each of the imaging modes, and it is possible to perform imaging appropriate to the scene. Furthermore, as a guide of the center key 102 on the UI display area 112, "out-of-focus adjustment" text is displayed.

In step S2, it is determined whether or not the user has pressed an "out-of-focus adjustment" button. In the example, the "out-of-focus adjustment" button is the center key 102. When the center key 102 is pressed, processing is transferred to step S3. In step S3, the imaging mode is locked at the imaging mode corresponding to the scene recognized immediately before the center key 102 was pressed. Then, processing is transferred to step S4 of an out-of-focus adjustment mode.

Figure 5B:
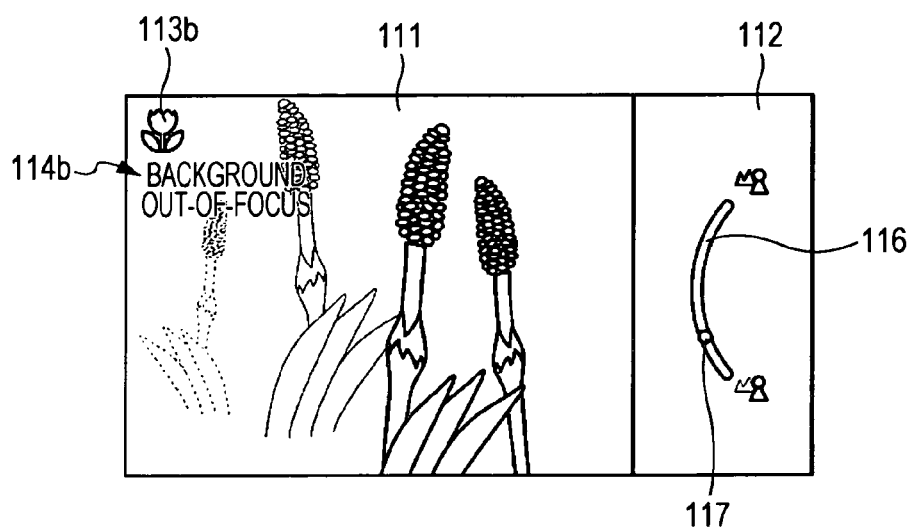

As shown in FIG. 5B, when transferring to the out-of-focus adjustment mode, on the image display area 111, the imaging mode icon 113a is changed to a locked imaging mode icon 113b and the imaging mode text 114a is changed to an adjustment mode text 114b. Furthermore, an arc-shaped indicator 116 and a shuttle 117 which shows the set value of the F-number due to the adjustment are shown on the UI display area 112.

Figure 6:
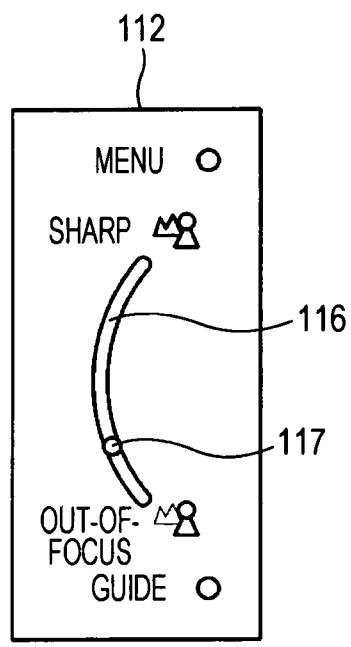
FIG. 6 is an approximate diagram used to describe a display when adjusting out-of-focus according to an embodiment of the invention.

In step S5, it is determined whether or not the user has adjusted the out-of-focus (F-number). When the user rotates the shuttle key 103, the shuttle 117 moves on the indicator 116. The F-number is changed by the rotation of the shuttle key 103. When the F-number changes according to the rotation of the shuttle key 103, the extent to which the camera-through image displayed on the image display area 111 is out of focus changes according to the adjustment. On the diagram, for simplification, the extent to which the camera-through image is out of focus is constant. As shown in FIG. 6, in each of the ends of the indicator 116, text of "sharp" and "out of focus" are displayed only during the operation of the shuttle key 103 and the operation direction of the out-of-focus adjustment is easy to understand.

The operation signal corresponding to the rotation of the shuttle key 103 is supplied to the CPU 51 of the control section 5. As described above, the camera section 1 and the digital signal processing section 2 are controlled in accordance with the program diagram of the imaging mode according to the scene recognized by the control section 5. The out-of-focus adjustment is performed by adjusting the F-number within the range of permissible changes of image characteristics in the program diagram of the selected imaging mode.

In addition, in a case when the center key 102 is pressed and there is a transfer from step S1 to step S2, it is possible that there is a case where the setting of the imaging mode is not completed due to the timing of the pressing. In this case, the imaging mode is locked as an imaging mode which is universally used in an imaging state where scene recognition is not determined. In this imaging mode, predetermined values are set in advance as an imaging parameter. As other methods, the imaging mode may be locked as an imaging mode corresponding to the nearest recognized scene (before or after).

When it is determined that the user has not adjusted the F-number in step S5, in step S6, it is determined whether or not a third operation section for ending the out-of-focus adjustment mode has been operated and a third operation signal has been generated. Here, the soft key 104 is used as the operation section for ending the out-of-focus adjustment mode. The operation signal generated by the soft key 104 being pressed is supplied to the CPU 51 and the CPU 51 performs the control for ending the out-of-focus adjustment mode. When it is determined that the soft key 104 has been pressed and the out-of-focus adjustment mode has ended, processing is transferred to step S7.

In step S7, the out-of-focus adjustment mode ends and the intelligent auto mode is restored. In the case when the intelligent auto mode is restored, the F-number set during the out-of-focus adjustment is reset and the F-number is set to a value according to the imaging mode according to the scene selection result.

Figure 7A:
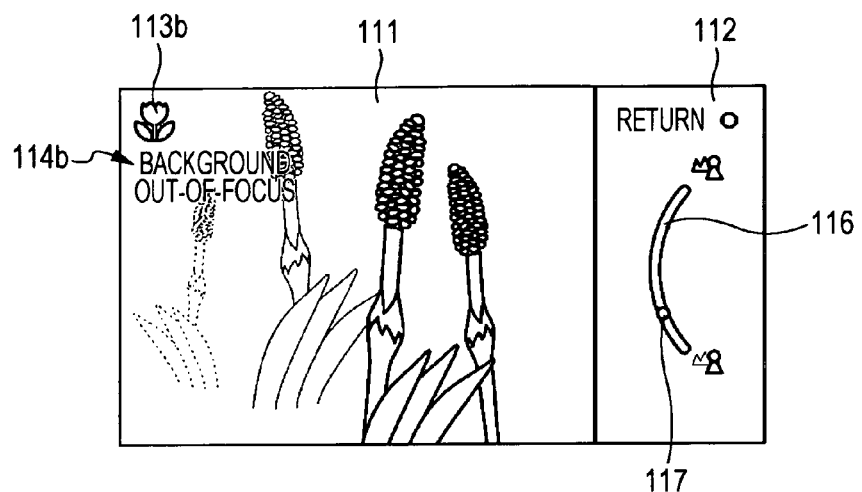
FIGS. 7A and 7B are approximate diagrams used to describe an LCD display screen according to an embodiment of the invention.
Figure 7B:
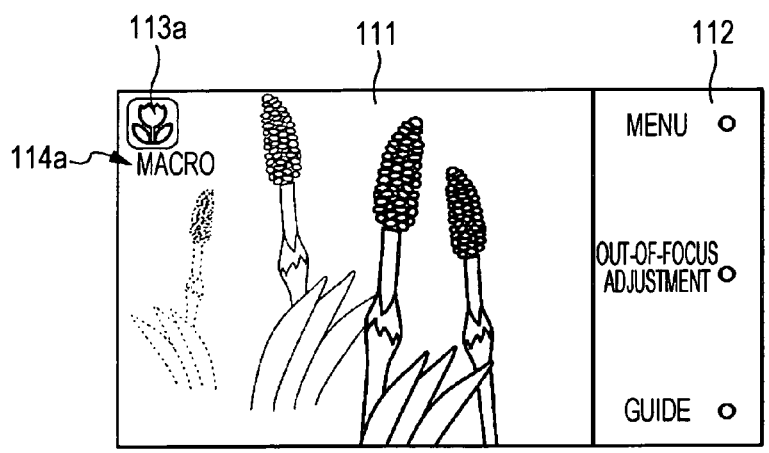

When the out-of-focus adjustment mode is ended by the pressing of the soft key 104, the image display during the out-of-focus adjustment shown in FIG. 7A changes to the image display shown in FIG. 7B. The image display shown in FIG. 7A corresponds to the image display shown in FIG. 5B. The image display shown in FIG. 7B corresponds to the image display shown in FIG. 5A.

Figure 4:
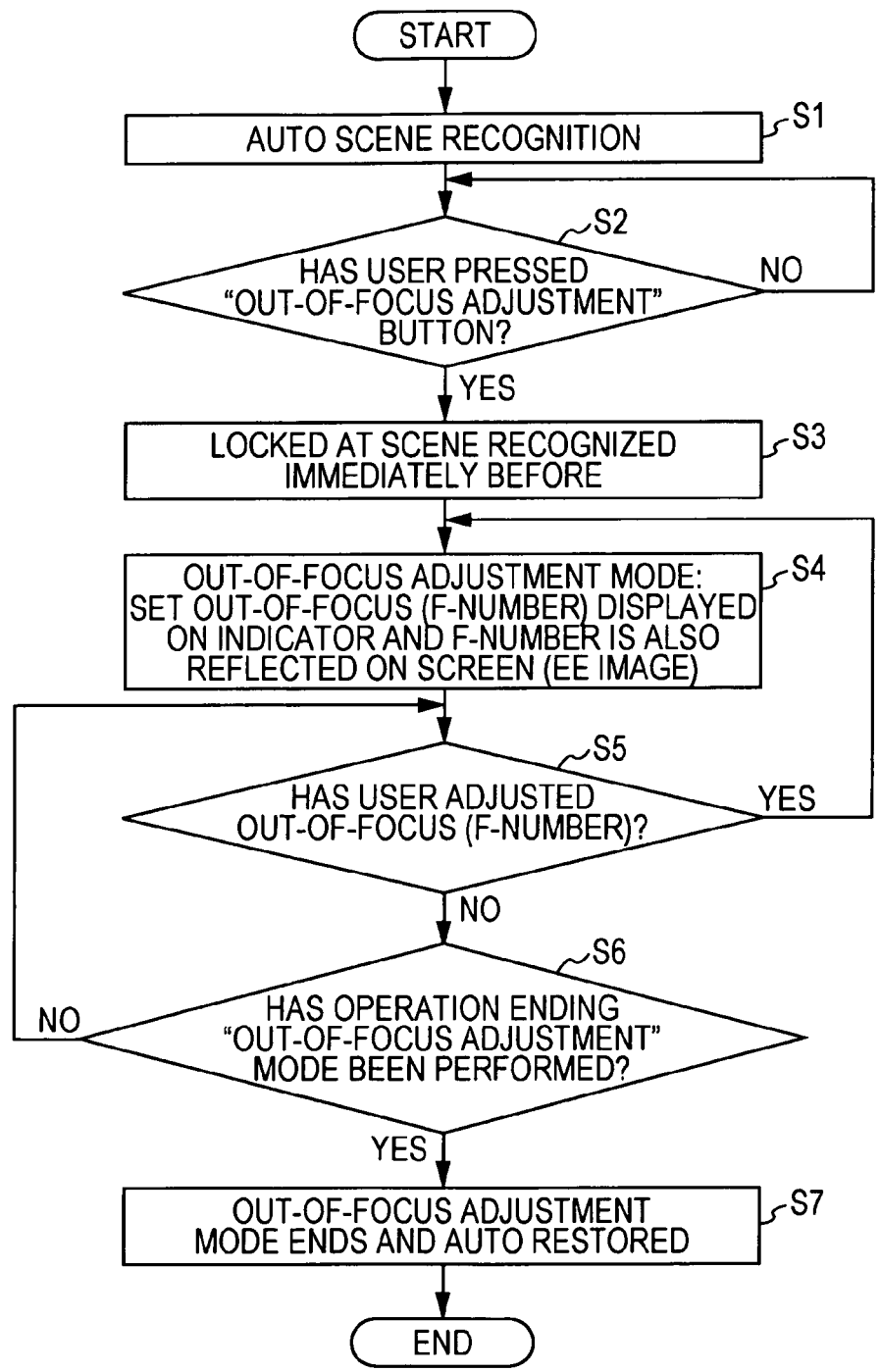
FIG. 4 is a flow chart illustrating a processing flow according to an embodiment of the invention.

In the flow chart shown in FIG. 4, the imaging operation due to the pressing of the shutter button 101 is possible in any state. For example, in the out-of-focus adjustment mode (step S4), when the shutter button 101 is pressed, the image processing for recording is performed and the image is recorded on the recording medium. After the imaging processing, the out-of-focus adjustment mode is restored. In the series of processing, the F-number is retained.

In the example described above, the out-of-focus adjustment mode is ended by the pressing of the soft key 104. However, the out-of-focus adjustment mode may be ended by the shutter button 101 being pressed and an imaging operation being performed. In this case, the content of the determination processing of step S6 in the flow chart shown in FIG. 4 changes to whether or not the shutter button 101 has been pressed (that is, whether or not imaging is performed).

Display Example of Indicator

Figure 8A:
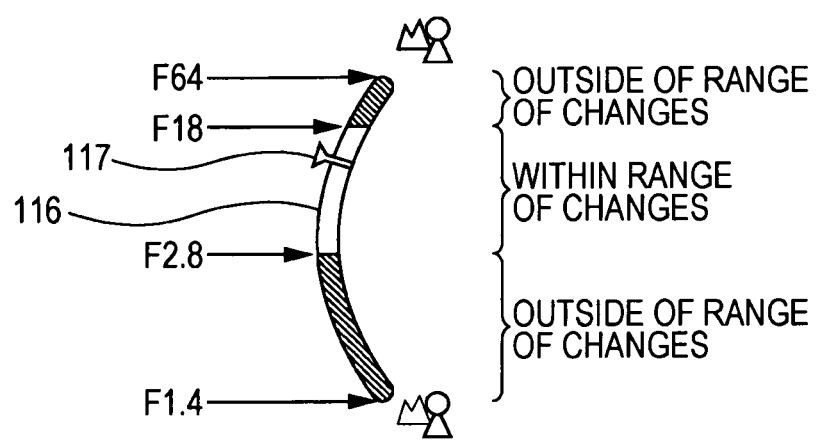
FIGS. 8A and 8B are approximate diagrams used to describe an indicator display method according to an embodiment of the invention.

As shown in FIG. 8, as a display method of the indicator 116, two types are possible. FIG. 8A shows an example where the out-of-focus adjustment indicator 116 is expressed as an absolute value. The range of F-numbers able to be taken by the imaging device (for example, F1.4 to F64) corresponds to the entire length of the indicator 116. The range of changes in the F-number is determined by the attached lens, the recognized scene (imaging mode), and the focal point distance of the zoom lens. For example, in a case of the range of changes of F2.8 to F18, as shown in FIG. 8A, both end portions of the diagonal lines of the indicator 116 are outside of the range of changes and only the center portion is within the range of changes.

Figure 8B:
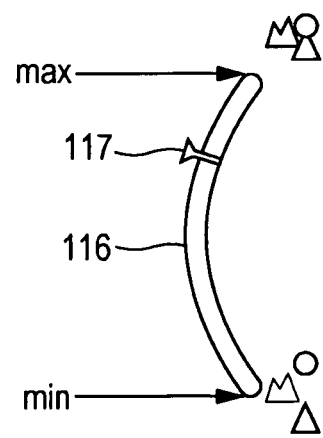

FIG. 8B shows an example where the out-of-focus adjustment indicator 116 is expressed as a relative value. Both ends of the indicator 116 respectively correspond to the maximum value and the minimum value of the F-number which is currently able to be taken. In a different example, the length of the indicator 116 represents the range of changes in the F-number. As described above, the range of changes in the F-number which is able to be taken changes, but due to the processing of the control section 5, the shuttle 117 typically moves between both ends of the indicator 116. In addition, the shuttle 117 may have a circular shape as shown in FIG. 5A or may have a shape as shown in FIGS. 8A and 8B.

Figure 9A:
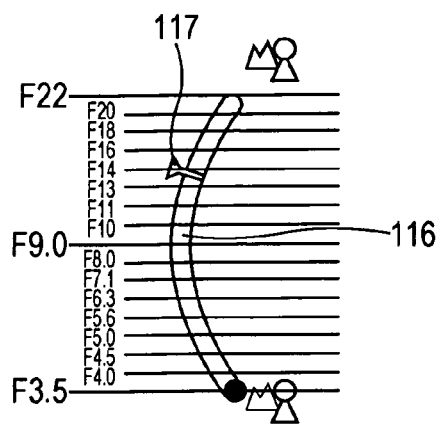
FIGS. 9A to 9C are approximate diagrams used to describe an indicator display method when using a zoom lens according to an embodiment of the invention.

In a case of a zoom lens, the focal point distance changes due to a zoom operation, and due to the changes in the focal point distance, the range of changes in the F-number changes. In a case of adopting the example where the out-of-focus adjustment indicator 116 is expressed as a relative value, with a focal point distance of 18 mm, the range of changes in the F-number becomes, for example, (F3.5 to F22) as shown in FIG. 9A. The adjustment value becomes, for example, F14. A black circle is added to a position of the minimum value of the F-number. In addition, in FIGS. 9A to 9C, the number of the F-number is shown, but when displaying, the number of the F-number is not displayed.

Figure 9B:
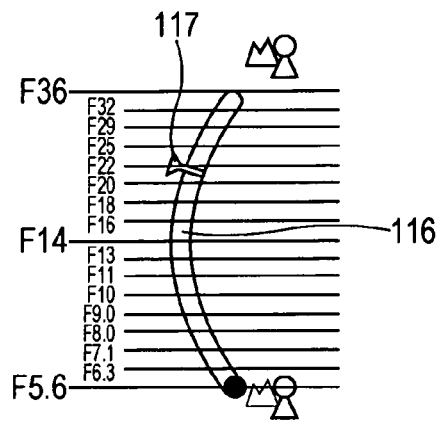

Next, when the user operates the zoom lens and the focal point distance becomes 70 mm, as shown in FIG. 9B, the range of changes in the F-number becomes, for example, (F5.6 to F36). At the black circle of the minimum value of the F-number, the F-number becomes F5.6. Even though the position of the shuttle 117 has not changed, the F-number at the position of the shuttle 117 becomes F22.

Figure 9C:
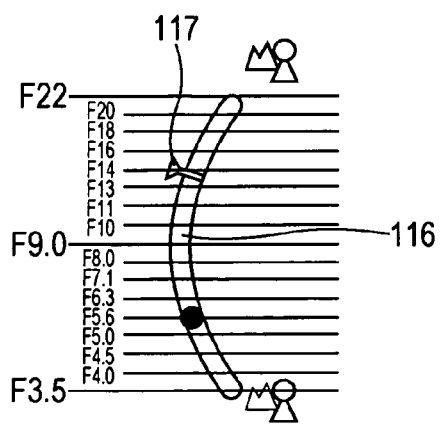

Next, when the user operates the zoom lens and the focal point distance becomes 18 mm, as shown in FIG. 9C, the range of changes in the F-number becomes, for example, (F3.5 to F22). The minimum value of the F-number becomes F3.5. When the focal point distance is 70 mm, the position of the minimum value (F5.6) becomes a position above the position of the minimum value. Even though the position of the shuttle 117 has not changed, the F-number at the position of the shuttle 117 becomes F14.

In this manner, during out-of-focus adjustment, the F-number indicated by the indicator 116 changes due to the focal point distance of the zoom lens. This is not preferable for a user in terms of operability. Accordingly, in the case when the zoom lens is attached, an expression of changes in the variable range according to the focal point distance of the zoom lens is preferable. In addition, it is possible for the CPU 51 to detect the type of lens attached and the focal point distance of the zoom lens using communication between a micro computer in the lens and the CPU 51. As an example, in the case where the attached lens is the zoom lens, the CPU 51 sets the display of the indicator 116 as a display of an absolute value (FIG. 8A), and in a case where a lens other than the zoom lens is attached, the CPU 51 sets the display of the indicator 116 as a display of a relative value (FIG. 8B). Then, the range of changes is controlled according to the focal point distance of the zoom lens.

2. Modified Examples

Above, the embodiment of the invention has been described in detail, but the invention is not limited to the embodiment described above and various modifications are possible based on the technical concept of the invention. For example, the form and the like of the operation keys and the UI display area 112 are not limited to the example described above and it is possible to use variations. Furthermore, the embodiment described above adjusts the F-number as a parameter, but the image characteristics may be adjusted by adjusting other parameters. That is, since the parameter may be the F-number, shutter speed, sensitivity, a white balance value, a creative style value, or a combination of two or more of these, any of these may be adjusted.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging control device comprising:
   a scene recognition section which recognizes scenes showing a subject by analyzing obtained image data;
   a display section which displays the obtained image data;
   an imaging mode selection section which prepares a plurality of imaging modes where a parameter which adjusts image characteristics according to each scene is set in advance and which automatically selects an imaging mode corresponding to the recognized scene from a plurality of imaging modes;
   a first operation section which generates a first operation signal which locks the imaging mode at a current imaging mode during the operation of automatically selecting the imaging mode; and
   a second operation section which generates a second operation signal which adjusts a portion of the parameter in a state where the imaging mode is locked,
   wherein an adjustment range using the second operation section is within a range limited by the locked imaging mode, and
   wherein when the portion of the parameter is being adjusted, displayed on the display section are (i) an indication that the imaging mode is locked, (ii) an indication of an adjustment mode, and (iii) a graphical user interface for implementing the adjustment.

2. The imaging control device according to claim 1, wherein, in a case where the scene recognition section has not completed recognition of a scene, the imaging mode is locked in an imaging mode, which is universally used in an imaging state where scene recognition is not determined, during an operation of the first operation section.

3. The imaging control device according to claim 1, wherein, in a case where the scene recognition section has not completed recognition of a scene, the imaging mode is locked in an imaging mode, which is selected in the nearest operation of the first operation section, during an operation of the first operation section.

4. The imaging control device according to claim 1, wherein the parameter after adjustment is reset from a parameter adjustment state and a third operation section is provided which generates a third operation signal for returning to a state where the imaging mode is automatically selected.

5. The imaging control device according to claim 4, wherein a shutter button is also used as the third operation section.

6. The imaging control device according to claim 1, wherein the parameter is at least one of imaging conditions and image data processing conditions.

7. The imaging control device according to claim 1, wherein the parameter is an F-number, shutter speed, sensitivity, a white balance value, an image style corresponding to an imaging intention and characteristics or a combination of two or more of these.

8. The imaging control device according to claim 7, wherein, in a case where the F-number is a parameter, a range of the F-number able to be obtained by the imaging device and a range of both ends of an indicator are matched, and the indicator is displayed on the display section.

9. The imaging control device according to claim 8, wherein focal point distance information is received from a zoom lens, and a movable range of the indicator is changed and displayed according to the received focal point distance information.

10. The imaging control device according to claim 7, wherein, in a case where the F-number is a parameter, a range of the F-number obtainable in a current state and a range of both ends of an indicator are matched, and the indicator is displayed on the display section.

11. An imaging control method comprising the steps of:
recognizing scenes showing a subject using a scene recognition section by analyzing obtained image data;
displaying the obtained image data using a display section;
preparing a plurality of imaging modes where a parameter which adjusts image characteristics according to each scene is set in advance and automatically selecting an imaging mode corresponding to the recognized scene from a plurality of imaging modes using an imaging mode selection section;
generating a first operation signal which locks the imaging mode at a current imaging mode using a first operation section during the operation of automatically selecting the imaging mode; and
generating a second operation signal which adjusts a portion of the parameter using a second operation section in a state where the imaging mode is locked,
wherein the adjustment range using the second operation section is within a range limited by the locked imaging mode, and
wherein when the portion of the parameter is being adjusted, displayed on the display section are (i) an indication that the imaging mode is locked, (ii) an indication of an adjustment mode, and (iii) a graphical user interface for implementing the adjustment.

* * * * *